United States Patent [19]

Bergholz

[11] Patent Number: 4,855,919
[45] Date of Patent: Aug. 8, 1989

[54] METHOD AND CIRCUITRY FOR THE DRIVING OF DRIVER STAGES FOR FUNCTIONS OF INTERNAL COMBUSTION ENGINES FOR AUTOMOTIVE VEHICLES ESPECIALLY FOR FUEL INJECTION OR IGNITION

[76] Inventor: Ralf Bergholz, Julicher Strasse 21, D-8500 Nürnberg 90, Fed. Rep. of Germany

[21] Appl. No.: 927,822

[22] Filed: Nov. 5, 1986

[30] Foreign Application Priority Data

Nov. 27, 1985 [DE] Fed. Rep. of Germany ....... 3541884

[51] Int. Cl.[4] .................. F02D 41/34; F02D 41/26
[52] U.S. Cl. ....................... 364/431.03; 364/431.04; 123/417; 123/146.5 A
[58] Field of Search ............ 364/431.03, 431.04, 364/569, 431.11; 123/416, 417, 146.5 A; 73/177.3, 116

[56] References Cited

U.S. PATENT DOCUMENTS

| | | | |
|---|---|---|---|
| 3,904,856 | 9/1975 | Monpetit | 364/431.03 |
| 3,906,207 | 9/1975 | Rivere et al. | 73/117.3 |
| 4,205,378 | 5/1980 | Ward | 364/431.1 |
| 4,209,833 | 6/1980 | Krupp et al. | 364/431.04 |
| 4,225,925 | 9/1980 | Hattori et al. | 364/431.04 |
| 4,236,213 | 11/1980 | Richardson | 364/431.04 |
| 4,429,365 | 1/1984 | Luckman et al. | 364/431.03 |
| 4,519,038 | 5/1985 | Matsui et al. | 364/431.03 |

FOREIGN PATENT DOCUMENTS 0152287 8/1985 European Pat. Off. .

Primary Examiner—Parshotam S. Lall
Assistant Examiner—Ellis B. Ramirez

[57] ABSTRACT

In a method for the driving of driver stages for operations of automotive internal combustion engines, for instance for fuel injection, including the use of timer-controlled output signals of a microcontroller for the cylinder-selective driving and for the presetting of operational start and operational stop of the driving in order to achieve as simple as possible driving, which can be adapted without problems to engines with different numbers of cylinders it is provided that with the one edge of the output signals of a first microcontroller a first address counter for operational start addresses is driven and that an output memory is addressed by it, wherein with the other edge of the output signals the output memory is changed to a state of "operational start", and that with the one edge of the output signals of a second microcontroller output a second address counter for operational transmitting addresses is driven and an operational memory is addressed by it, wherein with the other edge of the output signals the output memory is changed to a state of "operational end". The present invention relates to circuitry wherein to each otuput of a microcontroller is subordinated an address counter to the address counters and the outputs of the microcontroller are subordinated an output memory, and between the output memory and the inputs of the address counter selectively activatable overflow lines are provided.

9 Claims, 1 Drawing Sheet

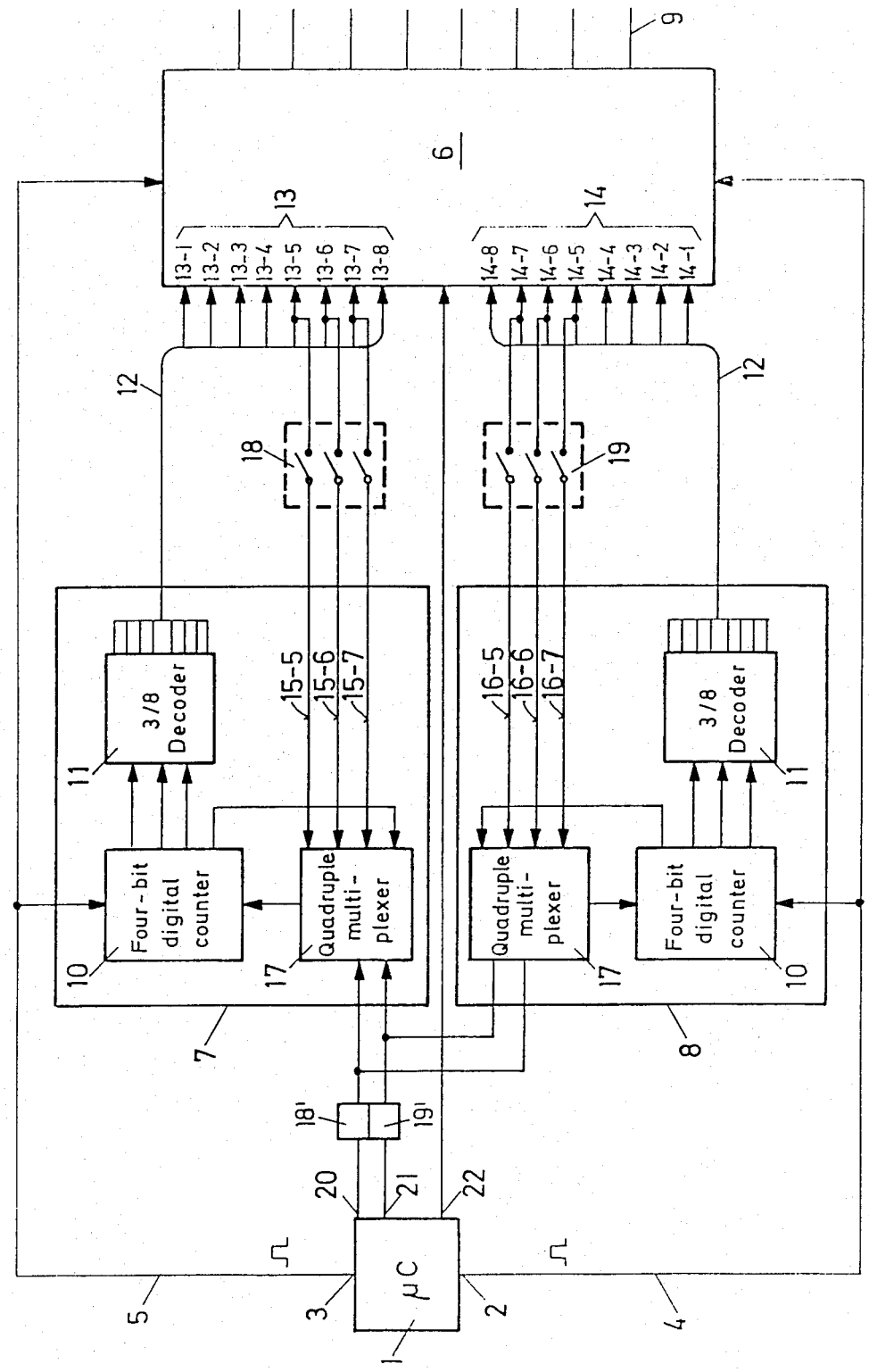

METHOD AND CIRCUITRY FOR THE DRIVING OF DRIVER STAGES FOR FUNCTIONS OF INTERNAL COMBUSTION ENGINES FOR AUTOMOTIVE VEHICLES ESPECIALLY FOR FUEL INJECTION OR IGNITION

FIELD OF THE INVENTION

The present invention relates to a method for the driving of driver stages of automotive vehicle internal combustion engines, especially for fuel injection and ignition, including the use of timer-controlled output signals of a micro-controller for the driving of selected cylinders and presetting of the start and the end of the driver stages for the function of internal combustion engines for automotive vehicles, especially for the fuel injection of selected cylinders, ignition starts and the like, comprising a micro-controller with at least two timer-controlled outputs.

BACKGROUND OF THE INVENTION

In connection with modern control or regulation of internal combustion engines, especially for automotive vehicles, to achieve optimal running of the engine is accomplished by preselecting the control or regulation by selecting respective cylinder, i.e., to achieve the driving of a certain cylinder in coordination with the others, but which can be correctible on an individual basis. Increased complexity in the area of the circuitry is the price of obviously achieved advantages. Such circuitry is known from EP-OS No. 152 287.

If, for instance, a cylinder-selective fuel injection engine is considered, it becomes necessary to have the ability to actually drive each single injection valve. For this purpose, timer-controlled outputs at the micro-controller of the circuitry have traditionally been required. Such outputs are connected via hardware with the timer in order that the condition of these outpus can be influenced directly, without an interrupt program. However, if other functions, such as ignition and control of knocking, are to be controlled or regulated by means of this microcontroller, such outputs are also necessary for this. In presently available microcontrollers, however, such outputs are not available in sufficient numbers and even when considering future developments, the need for such output will in any case lead to an increase in costs.

Another problem in connection with comparable traditional circuitry lies in the fact that they are not, at the same time, usable for engines with a different number of cylinders, requiring adaptation of the basic software to the number of cylinders and, if necessary, to the ignition sequence. In contrast thereto, it is desirable for reasons of cost to be able to use the same circuitry and software for different internal combustion engines and, at most, to provide individualization via specific modules.

SUMMARY OF THE INVENTION

Based on the foregoing, the object of the present invention is to make possible the cylinder-selective control or regulation of internal combustion engines with comparatively small demands on the microcontroller to be used, and usable without problems in connection with different types of internal combustion engines.

This object is achieved by providing at one edge, e.g., the ascending edge, of the output signals of a microcontroller output a first address counter for operational start addresses which is driven by the one edge of the output signals, and an output memory is addressed by this signal. At the other edge, e.g. the descending edge, of the output signal, the output memory is changed to a state of "operational start", and at the first edge of the output signal of a second microcontroller output a second address counter for operational transmitting addresses is driven and an output memory is addressed by the second address counter, wherein by means of the descending edge of the output signals the output memory is changed to a state of "operational end". A special advantage of the method in accordance with the invention is that even when the ON-conditions of the functions of the cylinders to be controlled overlap timewise, a cylinder-selective control or regulation is still possible. Additionally, a corresponding method can be used for engines with any number of cylinders below a preset maximal number of cylinders, for instance eight.

By means of the coding of the overflow lines a simple individualization for an internal combustion engine having a defined number of cylinders is made possible without having basically to interfere with the circuits or software.

An especially simple means of coding is accomplished wherein overflow lines between the output memory and the address counter is accomplished via switches, solder bridges or the like by opening or interruption of overflow lines. In another case, coding can be achieved either via a hardware coding switch or directly via the microcontroller by means of the software, which also allows a self-adapted solution.

The method wherein the outputs of the driver stages subordinated to the output memory are connected to the operational elements of the several cylinders in accordance with the individual ignition sequence of the engine allows, without interference with the hardware or software, an adaptation to the required firing sequence simply by having the vehicle manufacturer make the necessary adaptation in the cable harness.

The design wherein the microcontroller can switch off the parallel operation activated in the starting phase permits the switch from cylinder-selective driving to parallel operation of the several cylinders. This is important during the start-up phase, for instance, until a pickup emits a signal to identify a cylinder for the coordination of the cylinder-selective driving, so that a minimally sufficient running of the engine remains to the present.

The object according to the present invention is also achieved by means of circuitry wherein an address counter is subordinated to each output, and outputs of microcontroller and the address counters are subordinates to an output memory, and selectively activatable flow lines are provided between the output memory and the inputs of the address counters. This circuitry is distinguished by requiring only two timer-controlled outputs of the microcontroller, thus making available further corresponding outputs for the control of other functions.

The circuits provided with switchgear in the overflow lines can be used when the circuitry of the present invention is included in the control circuits for a specific internal combustion engine in order to achieve an adaptation to the number of cylinders of the internal combustion engine. The circuits can be embodied in the form of hardware, for instance as solder bridges, coding switches, or the like. Alternatively, another solution is possible by utilizing the I/O ports of the microcontroller for the control of the overflow lines.

Another embodiment of the circuitry which can be advantageously utilized in connection with a preset maximal number of eight cylinders includes an address counter having a four-bit counter with a 3/8 decoder subordinated to it, and the counter itself is subordinated to a quadruple multiplexer.

Further characteristics, advantages and details of the present invention are described in the following description of a preferred embodiment by means of the drawing. This consists of a block circuit diagram of the circuitry of the invention.

DESCRIPTION OF THE PREFERRED EMBODIMENT

A microcontroller 1 has timer-controlled outputs 2 and 3. When the circuitry in accordance with the present invention is used for the cylinder-selective control of the time and length of fuel injection, the output signals at outputs 2 and 3 are utilized as signals for the opening or closing of the fuel injection valves.

Subordinated to the outputs 2 or 3 via lines 4 or 5 is an output memory 6 as well as address counters 7 or 8, respectively, for the opening or closing addresses of the output memory 6.

The output memory 6 has outputs 9 connected with the driver stages for the fuel injection valves of the several cylinders. In the layout of the circuitry for internal combustion engines with maximally eight cylinders, eight of these outputs are required.

Each address counter 7 or 8 includes a four-bit digital counter 10, to which is subordinated a ⅜ decoder 11, the outputs of which are connected via lines 12 with the opening or closing addresses 13 or 14.

In the embodiment shown in the drawings of circuitry for internal combustion engines having four to eight cyilnders, overflow lines 15-5, 15-6, 15-7 or 16-5, 16-6, 16-7, respectively, lead from the opening addresses 13-5 to 13-7 and from the closing addresses 14-5 to 14-7, respectively, to the inputs of a quadruple multiplexer 17, the outputs of which is, respectively, connected with the four-bit digital counters 10.

Switchgear 18 or 19 is disposed in the overflow lines 15 or 16. This switchgear is embodied, for instance, as solder bridges and makes it possible to adapt the circuitry for use in connection with an internal combustion engine of a defined number of cylinders. For instance, if use with an internal combustion engine with four cylinders is planned, the overflow lines 15-5 or 16-5 are activated by operation of the switchgear 18 or 19, for instance by the forming of a solder bridge. In this embodiment the multiplexers 17 are not required.

Alternatively, it is possible to adaptively activate the outputs 20, 21 of the microcontroller 1, which are connected to the quadruple multiplexers 17 of the address counters 7 or 8, i.e., an identification signal indicating the number of cylinders is emitted by the microprocessor. The output 22 of the microcontroller 1 is connected to the output memory 6 in order to make possible a parallel operation of all cylinders during the starting phase.

Another means for a hardware coding consists in the provision of coding switchgear 18'. 19' behind the outputs 20, 21 of the microcontroller 1.

As seen from the above description, only two timer-controlled outputs 2,3, of the microcontroller 1 are needed for the operation of the circuitry according to the present invention. Which valve is to be opened or closed is determined by means of the address counters 7 or 8 through which the opening or closing addresses 13 or 14 of the output memory 6 are addressed. With the ascending edge of the closing or opening signal the contents of the output memory 6 are changed, while with its descending edge the address counters 7 or 8 are counted. "RESET" of the counter 10 is accomplished via the respectively activated overflow line 15 or 16.

The address counters 7 or 8 for the opening or closing work independently from each other, i.e., arbitrary opening time overlaps may result. During the use of the circuitry according to the invention for the control of ignition, arbitrary closing angle overlaps may result. Furthermore, different output memory addresses 13 or 14 can be addressed at the same time for opening and closing, thus fuel measuring errors, such as had up to now occurred when the problem was to be solved by means of interrupt routines, are avoided.

During parallel operation in the starting phase, all output memory cells are set and then are closed with each closing signal.

Connection of the driver stages for the several cylinders can according to the selected ignition sequence, be made by a corresponding ready-made adaptation of the cable harness without having to adapt the circuitry per se to the ignition sequence.

An advantage of the circuitry according to the present invention is that a corresponding module can be exchanged in such a way that group fuel injection can be accomplished with the aid of an RS flip-flop without problems.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A method for the driving of driver stages for operation of internal combustion engines of automotive vehicles, especially for fuel injection or ignition, including the use of first and second timer-controlled output signals of a microcontroller for the cylinder-selective driving and for the presetting of operational start and operational end modes of the driving, further including the use of a signal of a pickup to identify a cylinder for the coordination of the cylinder-selective driving, comprising the steps of driving a first address counter for operational start addresses by means of one edge of the first output signal;

addressing output memory by the first address counter;

changing the output memory to an operational start mode by means of the other edge of the first output signal;

driving a second address counter for operational transmitting addresses by means of one edge of the second output signal;

addressing the output memory by the second address counter;

changing the output memory to an operational end mode by means of the other edge of the second output signal.

2. A method in accordance with claim 1, further comprising
driving operational elements of several cylinders of an internal combustion engine in accordance with an individual ignition sequence of the respective internal combustion engine through driver stages receiving outputs from the output memory.

3. A method in accordance with claim 1, further comprising
switching off of parallel operation activated in a starting phase by the microcontroller.

4. A method in accordance with claim 1, further comprising
coding overflow lines between the output memory and at least one of the address counters in accordance with the number of cylinders of the internal combustion engine to be operated.

5. A method in accordance with claim 4, wherein
the coding is accomplished by the interruption of the overflow lines.

6. A method in accordance with claim 4, wherein the coding is accomplished via an input signal for the multiplexer of at least one of the address counters.

7. Circuitry for the driving of stages for operation of automotive internal combustion engines, especially for cylinder-selective fuel injection or ignition comprising
a microcontroller having at least a pair of outputs;
a pickup emitting a signal to identify a cylinder for the coordination of the cylinder-selective driving and being connected to said microcontroller;
an address counter connected to receive one of each of said microcontroller outputs;
an output memory also connected to receive said microcontroller outputs and outputs of said address counters;
selectively activatable overflow lines provided between said output memory and inputs of said address counters.

8. Circuitry in accordance with claim 7 wherein switchgear is provided in said overflow lines.

9. Circuitry in accordance with claim 8 wherein each of said address counters includes
a four-bit counter,
a $\frac{3}{8}$ decoder connected to receive output from said four-bit counter,
and a quadruple multiplexer connected to said four-bit counter.

* * * * *